United States Patent
Nomarski

[11] 3,825,349
[45] July 23, 1974

[54] POINT REFERENCE INTERFEROMETRY
[75] Inventor: Georges Nomarski, Bourg-La-Reine, France
[73] Assignee: Etablissement Public: Agence Nationale de Valorisation de la Recherche, Neuilly S/Seine, France
[22] Filed: Nov. 27, 1972
[21] Appl. No.: 309,798

[30] Foreign Application Priority Data
Dec. 3, 1971 France .................. 71.43511

[52] U.S. Cl. .................. 356/107, 356/109
[51] Int. Cl. .................. G01b 9/02
[58] Field of Search .......... 356/106, 107, 108, 109, 356/110, 111, 112, 113

[56] References Cited
UNITED STATES PATENTS
3,454,340  7/1969  Nomarski .................. 356/106

Primary Examiner—Ronald L. Wibert
Assistant Examiner—Conrad Clark
Attorney, Agent, or Firm—Revere B. Gurley

[57] ABSTRACT

The invention relates to improvements to point reference interferometry.

These improvements are characterized by the fact that within an optical circuit derived from the Sagnac interferometer and comprising a beam splitter M and a series of plane mirrors ($M_1$, $M_2$) sending the beam coming from the beam splitter (M) back to the same beam splitter, an object having a phase $\Omega_1$ is placed inside the circuit so compared. A refracting or diffracting transparent element causes an important change in the direction of the light rays traversing it at a point conjugated with itself or self-conjugated with respect to said beam splitter M.

The invention applies both to microscopy and macroscopy.

22 Claims, 9 Drawing Figures

POINT REFERENCE INTERFEROMETRY

This invention concerns improvements in a class of two-wave interferometry called "point reference interferometers." Interferometers of this type have been described in particular in the French Patent No. 1,429,314. The invention also concerns the interferometer, and its variants, using these improvements. The interferometer according to the invention has a wide field of application, particularly in microscopy.

The main objective of the invention is to produce an interferometer which, in its different forms, applies to all sizes of objects (whether in macroscopy or microscopy) in a simpler and more effective manner, i.e., by giving images of higher quality than the known interferometers.

To achieve this, the the invention improves two-wave-point reference interferometry for the study of transparent-phase or opaque — reflecting objects wherein these objects are placed inside an optical circuit derived from that of the Sagnac interferometer and consisting of a beam splitter and of a series of plane mirrors sending the beam coming from the beam splitter back to the same beam splitter, the phase object under study being placed in the circuit so formed. A retracting or diffracting transparent element causes an important change in the direction of the beams traversing it at a point conjugated with itself or self-conjugated with respect to said beam splitter.

The invention also concerns the special ways and means of producing interferometers, using the above improvements and intended for various applications.

One purpose of the invention is an interferometer particularly intended for macroscopy of objects which includes a beam splitter and an even number of mirrors all having the same plane of incidence (FIG. 1).

Such an interferometer may be used for the study of opaque and reflecting objects, in which case the beam arrives normal to the surface of the object and comes back into the circuit loop by means of an auxiliary, semi-reflecting beam splitter, the distance between the object and the refracting or diffracting element, via the auxiliary beam splitter, being constant (FIG. 5).

In an embodiment for the microscopy of transparent objects, the interferometer according to the invention includes a beam-splitter, an even number of mirrors and two identical lenses arranged symmetrically with respect to said self-conjugated point, the object to be studied being placed between this point and one of the lenses at a distance from said point which is large with respect to the depth of focus of the lens (FIG. 2).

According to another embodiment, intended particularly for macroscopy or for low-magnitude microscopy, the interferometer includes a beam splitter, an even number of mirrors, an afocal system interposed in said circuit, the object to be studied being placed inside the afocal system, and the self-conjugated point where the said refracting or diffracting element is placed being located outside of the afocal system, the images being observed by means of an instrument placed outside of the interferometer (FIG. 3).

In an embodiment of the interferometer of the above type for the study of opaque and reflecting objects, this interferometer is used with an object which is opaque and reflecting and the circuit is folded back so that the beam arrives normal to the surface of the object and comes back into the circuit loop by means of an auxiliary beam splitter. The afocal system is equivalent to a cataphote consisting of a single lens in which the reflecting object is placed at the first focus of the lens and the said refracting or diffracting element is placed in the second focus of the reflecting system lens between the beam-splitter and the auxiliary beam splitter (FIG. 6a).

According to another embodiment of the invention, the interferometer includes mirrors introducing an odd number of reflections into the incidence plane of the beam splitter and an odd number of reflections into a plane perpendicular to the said incidence plane, an afocal system being interposed in the system, and the object to be studied being placed inside the afocal system. The self-conjugated point where the refracting or diffracting element is placed is located in the middle of the circuit loop starting at the separator and returning to it, deduction being made of four times the focal length of the lenses constituting the afocal system, the images being observed by means of an observation telescope placed outside of the interferometer (FIG. 4).

In an application of this last embodiment to the study of opaque and reflecting objects, the circuit is folded back so that the beam arrives normal to the surface of the object and comes back into the circuit loop by means of an auxiliary semi-reflecting beam splitter. The afocal system is equivalent to a cataphote consisting of a single lens. The said reflecting object is placed at the first focus of the lens. The distance between the second focus of the lens and the refracting or diffracting element, via the auxiliary beam splitter, is constant, independent of the focal length of the cataphote system (FIG. 7).

Other characteristics and advantages will be brought out in the following description of the ways and means of producing interferometers using the improvements according to the invention, this description being given as an example only in connection with the annexed drawings on which:

The basic optical layout of the interferometer according to the invention consists of a series of plane reflecting surfaces and is related to that of the Sagnac interferometer.

Figure 1:
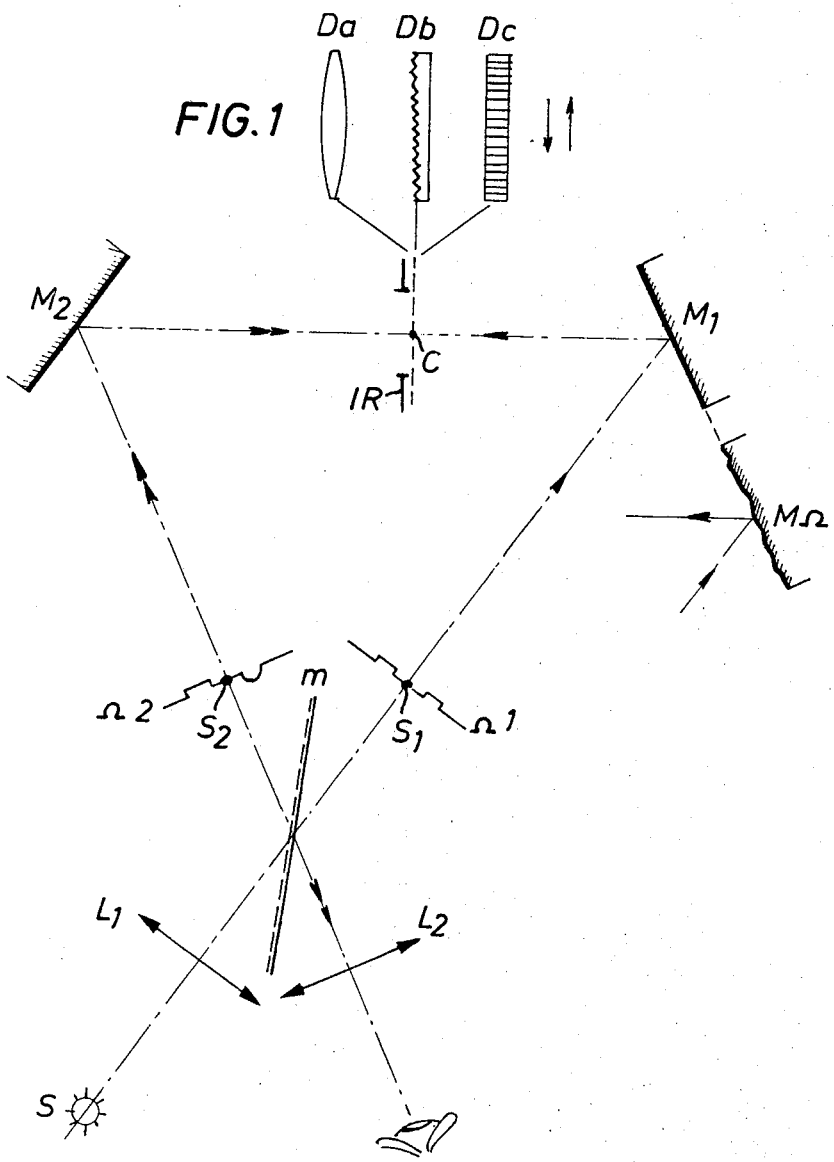
FIG. 1 represents the basic principle of an interferometer according to the invention, intended particularly for macroscopy.

FIG. 1 represents the basic principle of an interferometer according to the invention, intended particularly for macroscopy.

In the schematic representation of that figure, the three reflecting surfaces, one of them being a semi-transparent or beam-splitting surface m and two of them being opaque surfaces. $M_1$ and $M_2$, constitute, all other components of the interferometer excluded, the triangular Sagnac interferometer with its well known optical properties.

In the invention, a transparent component D (D$a$ or D$b$ or D$c$), which refracts or diffracts the light rays traversing it, may be placed in the plane passing through the optical center C of the interferometer. This optical center C is defined as the point conjugated with itself or self-conjugated with respect to the beam-splitting surface m. This conjugation is that of a point placed in front of a plane mirror with respect to its image in that mirror. In the case of FIG. 1, it is equidistant from surface m for both opposite directions in which the beams circulate inside the loop, i.e., the distance from m to M, to C equals the distance from $m$ to $M_2$ to C.

Experimentally if D is a lens D$a$ (refracting component), the interference figure does not depend either upon the focal length or upon the centering of the lens, and therefore it is possible to make vibrate or rotate eccentrically in its own plane. If D is an outside ground glass D$b$, one also obtains interferences with very high contrast, provided that the scattering face of the ground glass coincides with the center C.

On the other hand, it has proved to be impossible to use an opaline glass diffuser.

Since the ordinary ground glasses often have a specular transparency, a block D$c$ of a few mm. thickness gives interference fringes with very good image quality, which can be conserved in the case of coherent illumination with a laser for instance by making it vibrate in its plane, preferably using planetary motion.

This triangular Sagnac interferometer, modified by the addition of a transparent component D, which may be either refracting or diffracting, for use in the study of transparent objects placed inside it, must be completed so that it may operate as an interferometer with point-reference. For this purpose, a nearly point-like source S and a collecting lens L$_1$, which forms real images S$_1$ and S$_2$, are used symmetrically with respect to the separator surface m and are located somewhere within the optical circuit loop. By placing an object having a phase $\Omega_1$ in the plane of S$_1$, one may observe with a magnifying glass L$_2$ the interference fringes drawing lines of equal optical thickness of the object with respect to its optical thickness at the point S$_1$. In the case where the component D is a single lens D$_a$, the lighting remains of the spatially coherent type. However, by changing the focal line of lens D$_a$, one may adjust the lighting range on the object, thus obtaining a better image luminosity. Furthermore, by displacing lens D$_a$ along the axis, one sees Newton fringes appearing on the object, the density of which increases continually with the distance separating C from D$_a$. Thus, it is possible to compensate for a certain divergent or convergent action of the object $\Omega_1$, which is an interesting possibikhty.

In the case where the component D is a frosted glass D$_b$ or a block of optical fibers D$_c$, the lighting is no longer of the spatially coherent type but becomes coherent - diffuse, with an unmovable and partly coherent (spatially) diffuser with a movable diffuser.

Advantages of the latter type of lighting are known, and include elimination of optical granulation (speckling) and improvement of resolution.

To be able to adjust the angular opening of the lighting beam, an iris diaphragm Ir may be placed against the component D, where D is a diffuser D$_b$ or D$_c$.

It is important for comprehension to note that the number of reflections is even in this case, and maybe two or four depending on the direction of the path (two toward the left, four toward the right) when considering the figure). This is true only in the case in which the plane passing through C is self-conjugated with the enlargement being equal to + 1.

The object having a phase $\Omega_2$ which is placed at S$_2$ is interchangeable with the object $\Omega_1$. If the two objects are in place, the device becomes an interferential comparator with numerous applications.

One may also study reflecting surfaces. It suffices to replace one of the mirrors, M$_1$ for instance, by the surface of the object M$\Omega$ to be studied, which will be studied here under an oblique incidence.

Figure 2:
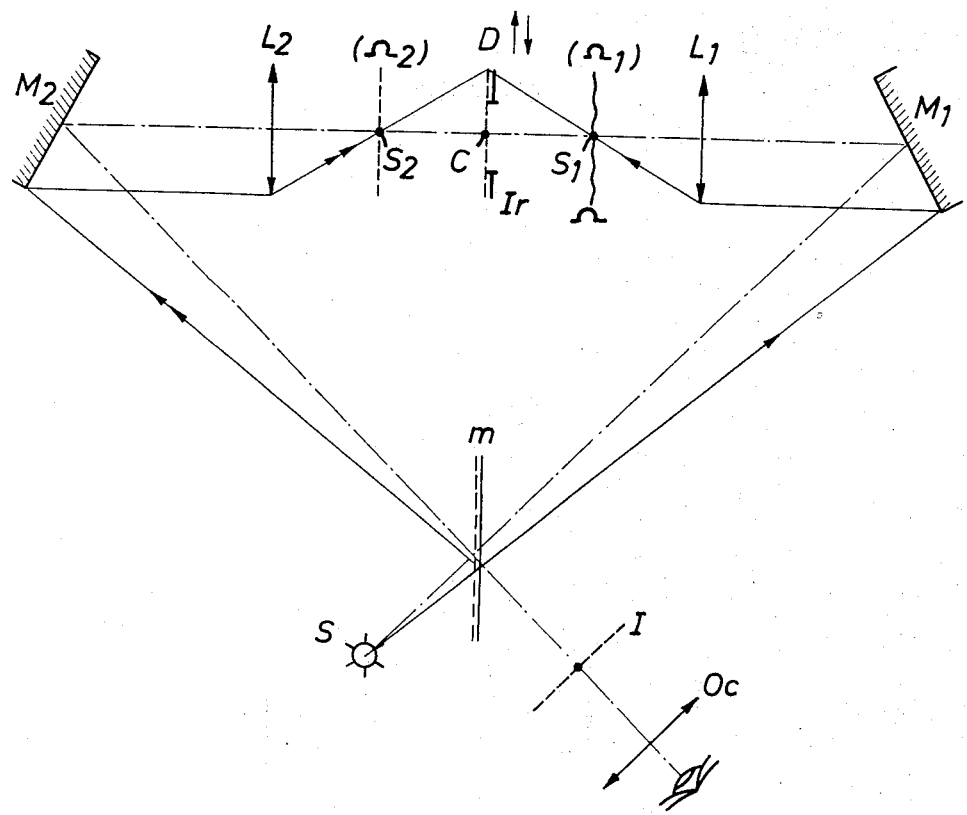
FIG. 2 represents the basic principle of an interferometer according to the invention, intended particularly for microscopy.

FIG. 2 represents an application of the invention to microscopy of transparent objects.

Two lenses L$_1$ and L$_2$ with the same focal line are placed symmetrically on either side of component D, which in this case is preferably an unmovable or movable diffuser. A microscopic preparation, constituting an object of phase $\Omega$, is placed on the plane of the real image of source S formed by the lens L$_1$ (microscope objective), the lens itself being placed at a certain distance from C, this distance being very high compared to the depth of field of L$_1$.

An iris diaphragm Ir, placed on the plane of D, limits the opening of the lighting beam. Because of the symmetry of the system with respect to the plane of D which is placed at C, the coherence of the interfering waves is obtained. Therefore, FIG. 2 represents a diagram of an interferential microscope according to the invention which is simple and easy to construct. Lenses L$_1$ and L$_2$ are then respectively the microscope objective and the condenser. It is evident that the object may be placed either at S$_1$ ($\Omega_1$) or at S$_2$ ($\Omega_2$). One may also study two objects respectively of phase $\Omega_1$ and $\Omega_2$ and in that case the device becomes an interferential comparator. For this instrument to be able to operate as an interferential microscope, it must be completed by a nearly point-like source S conjugated with the planes $\Omega_1$ and $\Omega_2$ with respect to the lenses L$_1$ and L$_2$, as well as by an eyepiece O$_c$ sighting the image plane I conjugated with S with respect to the separator m.

The adjustments affecting the observed interference fringes are made on the one hand, by inclining one of the three reflecting surfaces m, M$_1$ or M$_2$ and, on the other, by a displacement along the axis either of lens L$_2$ with the object at S$_1$ or of the diffuser D.

Figure 3:
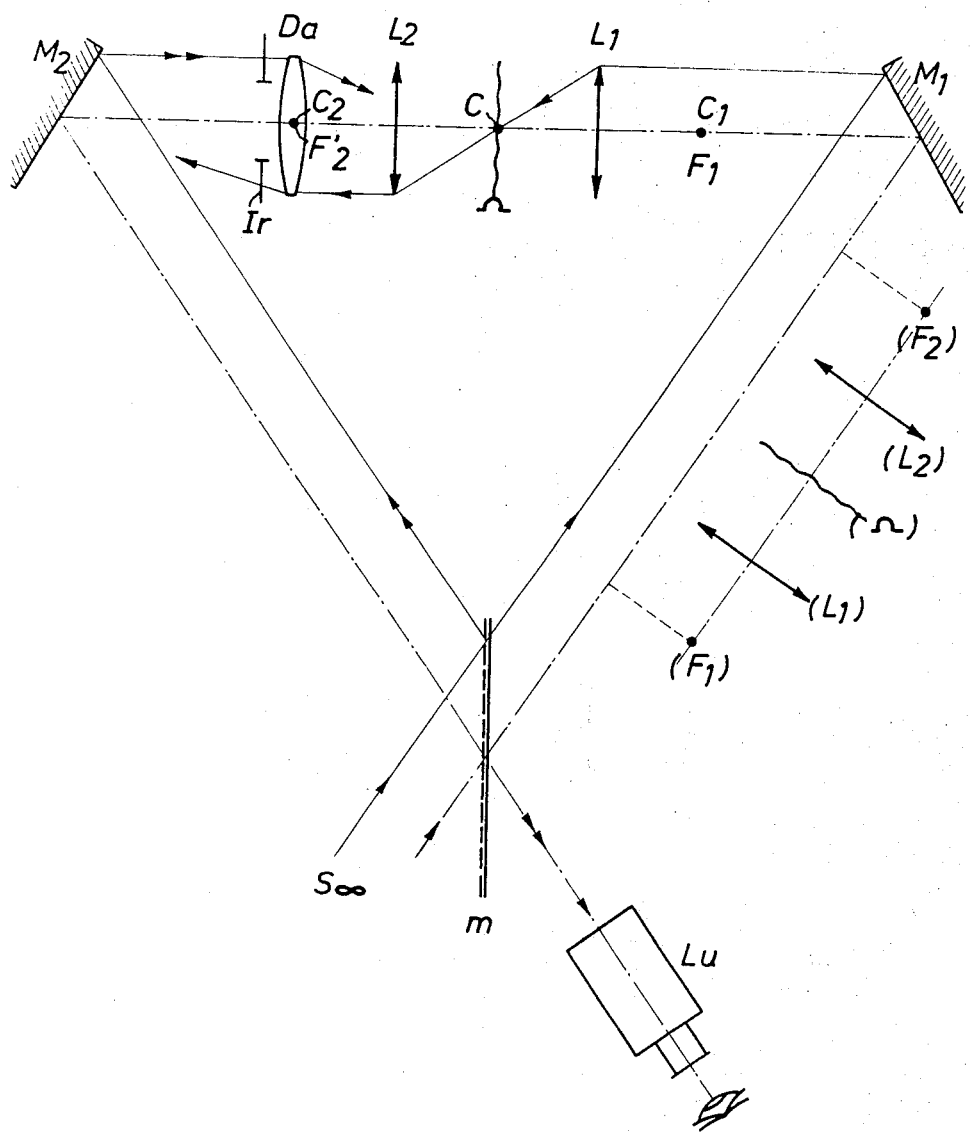
FIG. 3 represents the basic principle of an interferometer according to the invention, intended mainly for macroscopy and for low-magnification microscopy.

FIG. 3 represents the basic principle of another means of producing the inteferometer according to the invention, using, like the preceding, an arrangement of mirrors like in the Sagnac interferometer. However, its operational principle is slightly different. This interferometer includes within its loop an afocal system of − 1 enlargement consisting of two identical lenses L$_1$ and L$_2$ placed symmetrically with respect to the separator m, the object $\Omega$ being between the lenses or, more particularly, it may coincide with the common focus of $L_1$ and $L_2$.

With the optical center C being occupied by the object $\Omega$, it is not possible to place there the refracting or diffracting component D. When looking for other self-conjugated points with respect to $m$, located outside of the afocal system $L_1L_2$, one finds two, $C_1$ and $C_2$, coinciding with the external foci $F_1$ and $F_2$ of the system $L_1L_2$.

The afocal system of $G = -1$ (where G is enlargement or gain) effects a 180° rotation and, for this reason, the points $C_1$ and $C_2$ are self-conjugated with respect to $m$, with enlargement equal to $-1$. The consequence of this is the obligatory use of a component D symmetrical with respect to its center. A single lens $D_a$ fulfills the required condition well. Its power is determined as a function of the focal length of $L_1$ and of the effective diameter of the object field $\Omega$. In this particular case, the lens $Da$ should be well centered so that the interference fringes are spread out, which supplies a convenient means of adjusting the interferometer according to the invention.

Contrary to the devices described previously, the object $\Omega$ receives here a spatially coherent type of lighting. This version is above all usable in macroscopy or in lowenlargement microscopy. However, one may use a diffracting screen $D_b$ in the place of the lens $D_a$ but, in that case, the complex amplitude transmission of this particular diffuser $D_b$ must fulfill the symmetry condition:

$$p(u, v) = p(-u, -v)$$

where $p$ is the complex transmission of $D_b$ and $(u, v)$ are the rectangular coordinates in its plane.

The coherence, and consequently the quality, of the interferences will then depend on the perfection of the symmetry of this diffracting screen.

In addition, the symmetrical component D is at a distance equal to $2f_1 = 2f_2$ from the center C. What is remarkable is that D must remain in place regardless of the position of the assembly of elements $L_1$, $\Omega$. and $L_2$ within the loop between surfaces $m$, $M_1$, and $M_2$. In particular, the afocal system $L_1L_2$ with the object $\Omega$ in its center may approach $m$. If the right side between $m$ and $M_1$ is chosen to place the assembly of elements $L_1$, $\Omega$, and $L_2$, only the point $C_2'$ is real with respect to the system $L_1L_2$ and it is there that the symmetrical component D should be placed.

The arrangement according to FIG. 3 may be used as the base for the construction of an interferential microscope according to the invention. This construction is simplified through the closeness between the separator $m$ and the lenses ($L_1$) and ($L_2$), acting respectively as objective and condenser. It suffices then to complete the assembly by the addition of a point like source S effectively at infinity and by an afocal observation glass Lu.

Figure 4:
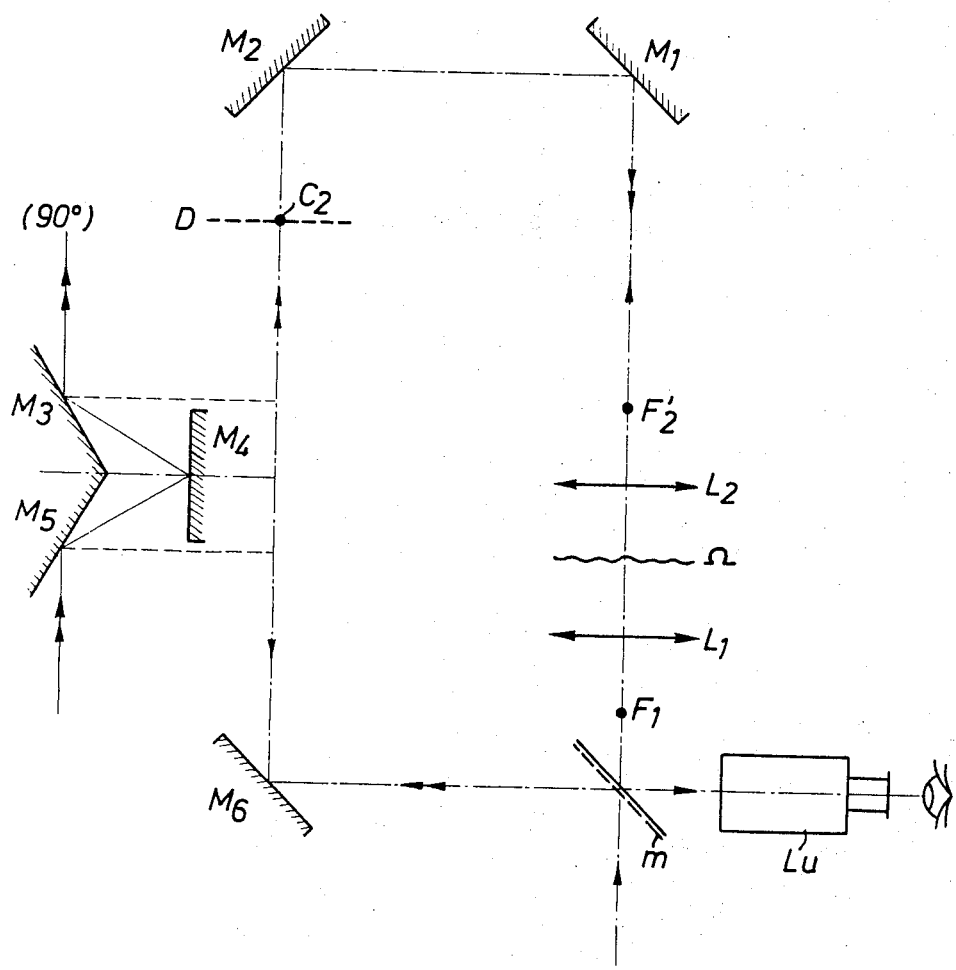
FIG. 4 represents the basic principle of another means of producing the interferometer according to the invention.

FIG. 4 shows schematically an arrangement derived from the preceding one. However, this time, the self-conjugated point C has been imparted a magnification equal to $+1$ despite the presence of the afocal system $L_1L_2$ reversing the images.

Although it is theoretically possible to turn over the images again by means of a second afocal system of $G = -1$, it is preferable to effect the required rotation of 180° by means of a system composed of plane mirrors. The solution sought is obtained by introducing an odd number of reflections in the "incidence plane" of a surface $m$ and, in addition, an odd number of reflections in a plane perpendicular to the incidence plane of $m$. This is illustrated in FIG. 4 by the three opaque mirrors $M_1$, $M_2$ and $M_6$ and by the three opaque mirrors $M_3$, $M_4$ and $M_5$, the incidence plane of the latter being perpendicular to the plane of the figure.

The point $C_2$, in the middle of the loop starting from $m$ and returning to $m$ without counting the distance $F_1F'_2$ equals $4f_1 = 4f_2$. Thus, one should check the equality of the optical trajectories: $(m\ M_1\ M_2C) - 4f_1 = m\ M_6\ M_5\ M_4\ M_3\ C$.

In this procedure, one may use a nonsymmetrical refracting or diffracting component D and, therefore, the frosted glass $Db$ or the optical fiber block $D_c$ of FIG. 1, are suitable.

It is possible and advantageous to have D vibrate or rotate in its plane without this influencing the coherence of the interferential system.

The objective $L_1$ and the condenser $L_2$, with the object $S_1$ in the center, constitute the microscope, to which is added the glass Lu, placed at the interferometer outlet.

When studying reflecting objects with nearly plane surface in vertical incidence, it is necessary to fold back the assembly loop derived from the Sagnac interferometer.

Figure 5:
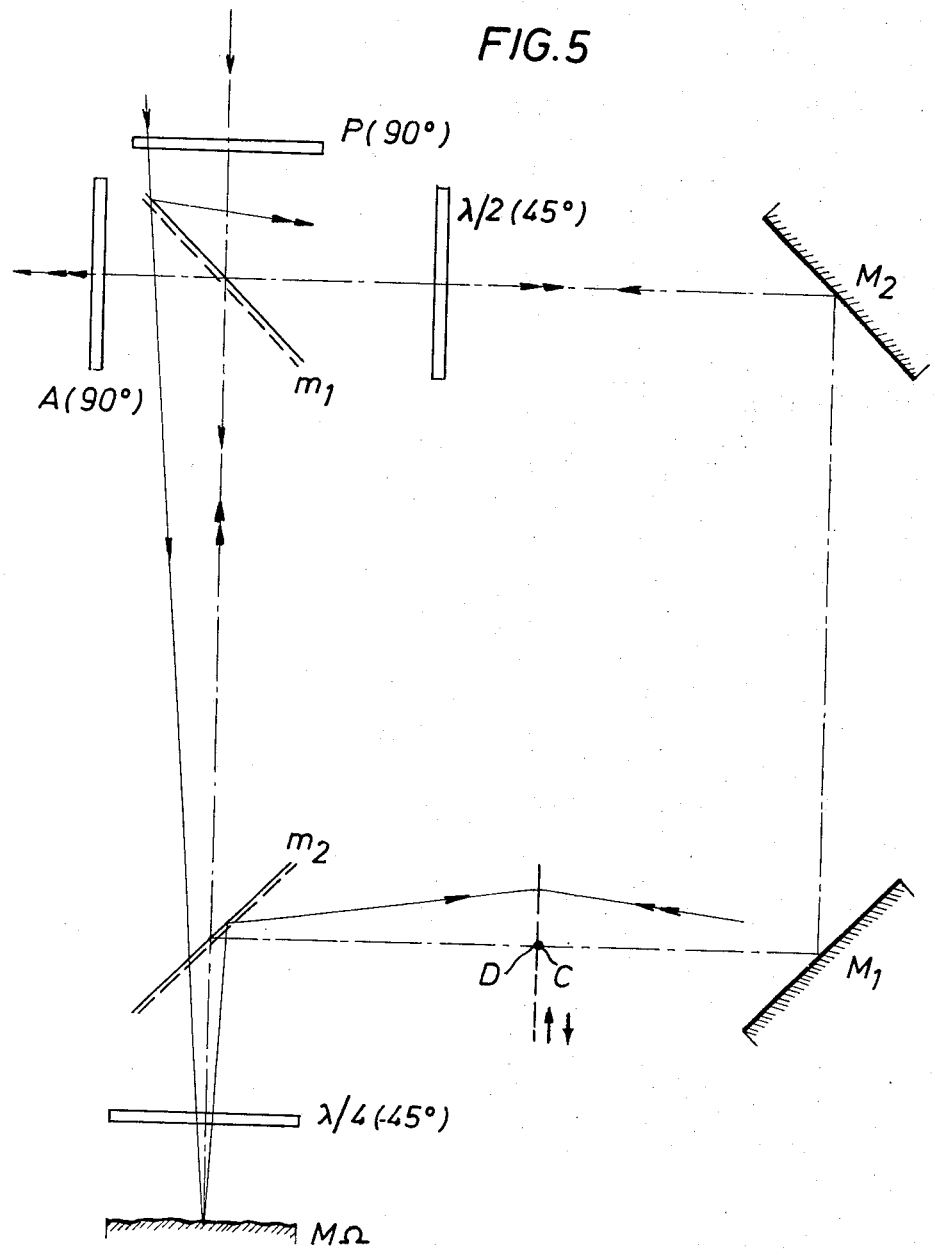
FIG. 5 represents the basic principle of an interferometer according to FIG. 1, applied to the study of opaque and reflecting objects.
Figure 6C:
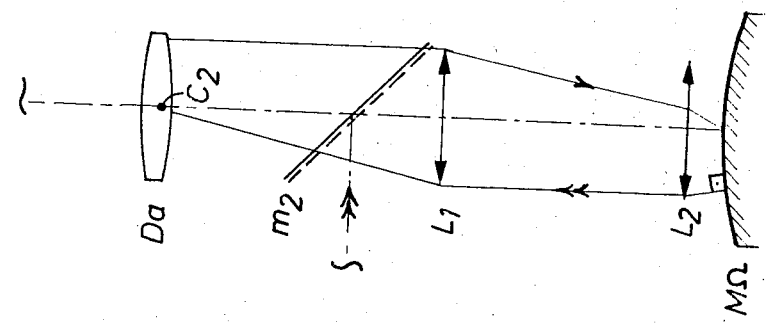
FIGS. 6b and 6c represent partially the basic principle of the interferometer of FIG. 6a in the case where the reflecting object is respectively concave or convex.
Figure 6B:
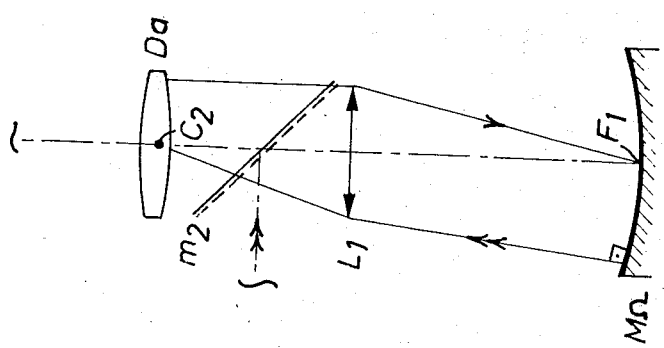
Figure 6A:
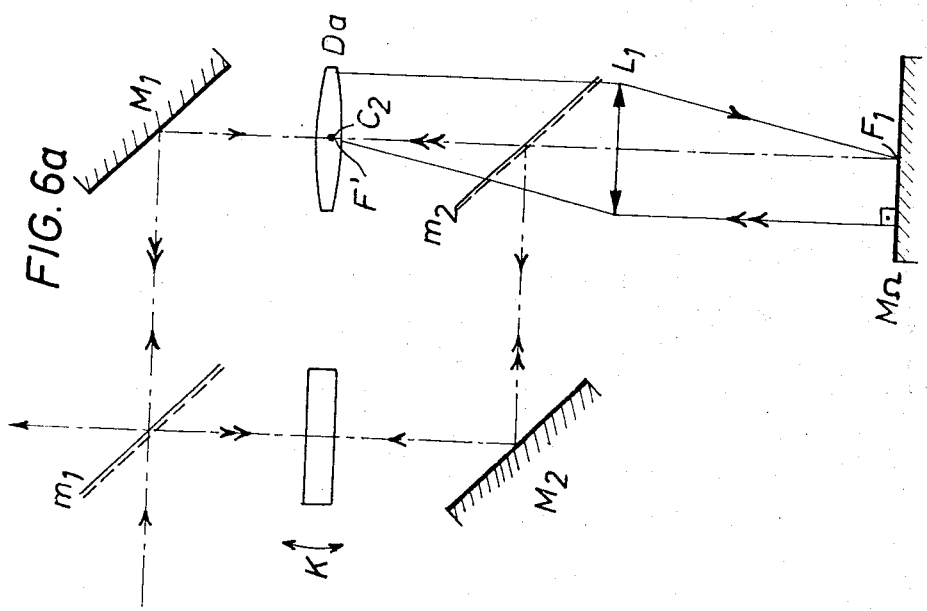
FIG. 6a represents the basic principle of an interferometer according to FIG. 3, applied to the study of a plane reflecting object.
Figure 7:
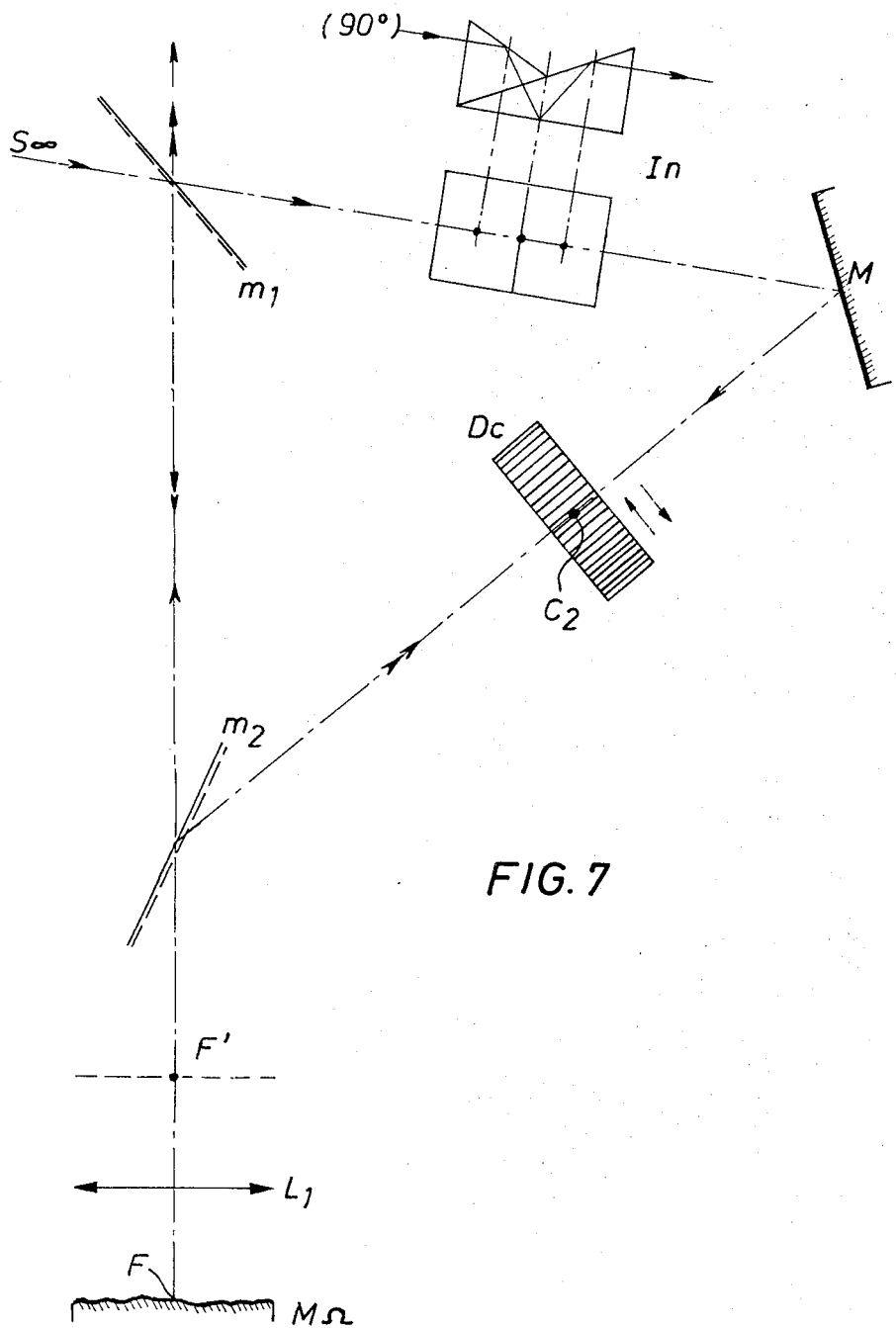
FIG. 7 represents the basic principle of an interferometer according to FIG. 4, applied to the study of opaque-reflecting objects.

FIG. 5 illustrates such an arrangement, which can be used in macroscopy.

With the main separator being $M_1$, there is added an auxiliary separator $M_2$, which folds back the loop and sends light rays on the object surface $M\Omega$. The system is then optically equivalent to the one represented by FIG. 1 and the optical center C is easily found there by checking the equality of the two paths:

$$m_1, M\Omega, C = m_1\ M_2\ M_1\ C$$

Since the number of reflections, including the one on the object surface $M\Omega$ is even, C is self-conjugated with the magnification equal to $+1$, which makes possible the use of a component D of the diffusing type. In the nonlimitative case of FIG. 5, where the surfaces $m_1$, $m_2$, $M_1$ and $M_2$ are arranged in the form of a rectangle, it is remarked that, where the distances $m_2$, $M\Omega$ and $M_1C$ are equal i.e. for a given assembly, the sum of the distances $CM_2 + m_2M\Omega$ must remain constant. This provides a simple means of adjusting this variant of the interferometer according to the invention.

To eliminate the undesired light rays not following the loop and coming back on themselves, one may complete the system by a device called a biasing optical valve, consisting, for instance, of a quarter wave plate $\lambda/4$, inserted somewhere between $m_2$ and $M\Omega$, and a half wave plate $\lambda/2$, inserted somewhere within the loop except for the interval $m_2$, $M\Omega$. It is advantageous to cross the slow axes of the quarter wave and half wave plates, which are oriented at $\pm 45°$ with respect to the incidence plane of $m_1$, and to place the assembly between a polarizer P, oriented at 90°, and an analyzer A of the same orientation.

The undesirable light rays are due to the introduction of the auxiliary separator $m_2$ and do not exist in assembly with unfolded loop.

Interferometric inspection is often used to test the quality of the plane or spherical surfaces, which might be quite large.

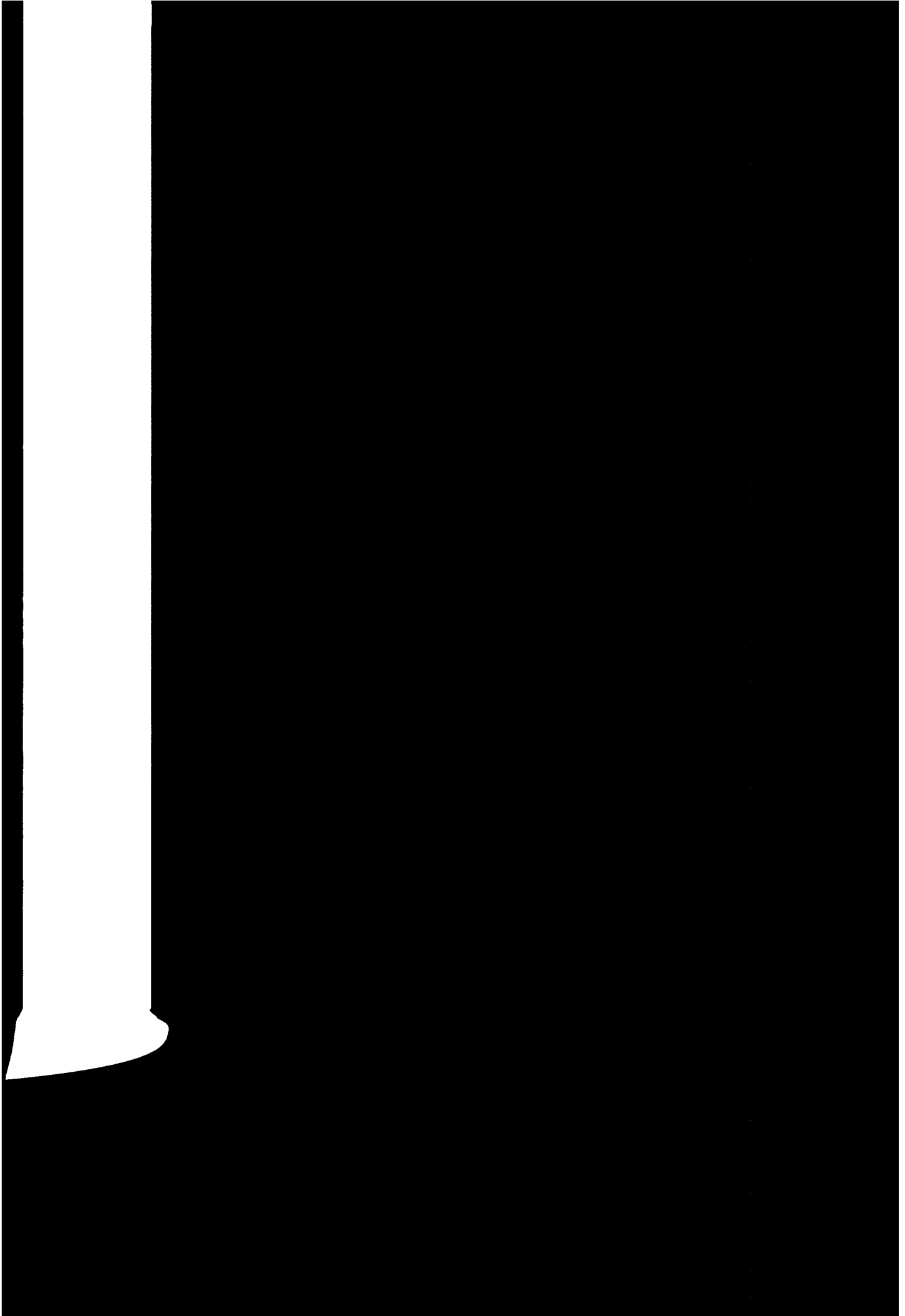

conjugated point, the object to be studied being placed between the self-conjugated point and one of the lenses at a distance from said point which is large with respect to the focus depth of the lenses.

7. An interferometer in accordance with claim 1, wherein the transparent means is subjected to vibrations or rotations in its plane.

8. An interferometer according to claim 1, particularly intended for macroscopy or small enlargement microscopy, wherein the plurality of mirrors comprises an even number of mirrors, and further comprising an afocal system interposed in said circuit, the object to be studied being placed within the afocal system and the self-conjugated point where the said transparent means is placed being located outside of the afocal system, and further comprising an instrument placed outside of the interferometer for observing the images.

9. An interferometer according to claim 8, wherein the self-conjugated point is located at a distance from the interferometer center equal to double the lens focal length of the afocal system.

10. An interferometer according to claim 8, wherein the object is opaque and reflecting and wherein the beam travels a circuit which is folded so that the beam arrives normal to the surface of the object and returns into the circuit loop by means of an auxiliary semi-reflecting beam-splitter, the afocal system, being of the reflecting type formed by a single lens, and the said reflecting object, being placed in the first focus of the lens, the transparent means, whether refracting or diffracting, being placed in the second focus of the reflecting system lens between the separator and the auxiliary separator.

11. An interferometer according to claim 10, wherein, when the object surface is spherical, whether concave or convex, the transparent means is placed at a point where beams perpendicular to the surface of said object cut the optical axis.

12. An interferometer according to claim 10, further comprising adjustment means for displacement of the transparent means in its plane along two mutually perpendicular directions.

13. An interferometer according to claim 10, further comprising a parallel-plane plate in the beam path and inclinable in two mutually perpendicular directions to accomplish minor compensation.

14. An interferometer according to claim 1, particularly intended for microscopy of objects, characterized in that it includes mirrors in the path of the beam for introducing an odd number of beam reflections into the incidence plane of the beam splitter and for introducing an odd number of beam reflections into a plane perpendicular to said incidence plane, and further comprising:
A. an afocal system interposed in the circuit, the object to be studied being placed within the afocal system, and
B. the self-conjugated point, where the transparent means is placed, being located in the middle of the loop path as measured beginning with the beam-splitter and returning to it, deduction being made from this distance of four times the lens focal length of the afocal system, and
C. further comprising an observation glass placed outside of the interferometer for observing the images.

15. An interferometer according to claim 14, wherein the object is opaque and reflecting and wherein the beam path is folded so that the beam arrives normal to the surface of the object and returns into the beam path circuit by means of an auxiliary semi-reflecting beam splitter, the afocal system being of the reflecting type formed by a single lens, and the said reflecting object being placed in the first focus of the lens, the distance between the second lens focus and the transparent means via the auxiliary beam splitter being constant and independent of the focal length of the reflecting afocal system lens.

16. An interferometer according to claim 15, further comprising a series of objectives of different focal length, wherein the coherence adjustments are effected by the axial displacement of the transparent means corresponding to the variation of the position of the image focus of the objective being used.

17. An interferometer according to claim 1, wherein the transparent means is a symmetrical lens.

18. An interferometer according to claim 1, wherein the transparent means is diffracting and is formed of an optical fiber block.

19. An interferometer according to claim 1, wherein the transparent means is a diffracting means and consists of an optical fiber block.

20. An interferometer according to claim 19, further comprising means for subjecting the diffracting means to low-amplitude motion in its plane.

21. An interferometer according to claim 1, wherein the effective opening of the transparent means is limited by a diaphragm with an adjustable opening.

22. An interferometer according to claim 1, further comprising:
A. an auxiliary beam splitter for folding the beam path between the auxiliary beam splitter and said object,
B. an auxiliary device working in polarized light, composed of a parallel polarizer and analyzer, the polarizer operating on the light beam from the beam source before it reaches the first beam splitter and the analyzer operating upon a recombined beam from the first beam splitter,
C. a birefracting quarter-wave plate $\lambda/4$ inserted between the surface of the object and the auxiliary beam splitter, and
D. a birefracting half-wave plate $\lambda/2$ inserted in the path of the split beam outside of the space separating the object from the auxiliary beam splitter, the two wave plates $\lambda/4$ and $\lambda/2$ being oriented so that their slow axes are crossed and oriented at 45° with respect to the direction of the vibration transmitted by the polarizer and the analyser.

* * * * *